US008139519B2

United States Patent
Ahn et al.

(10) Patent No.: US 8,139,519 B2
(45) Date of Patent: Mar. 20, 2012

(54) METHOD FOR TRANSMITTING AND IDENTIFYING TRANSMIT POWER VALUE IN MULTI-USER MIMO

(75) Inventors: Joon Kui Ahn, Gyeonggi-do (KR); Dong Wook Roh, Gyeonggi-do (KR); Bong Hoe Kim, Gyeonggi-do (KR); Ki Jun Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 307 days.

(21) Appl. No.: 12/562,946

(22) Filed: Sep. 18, 2009

(65) Prior Publication Data

US 2010/0074237 A1  Mar. 25, 2010

(30) Foreign Application Priority Data

Sep. 18, 2008  (KR) .................. 10-2008-0091709

(51) Int. Cl.
*H04B 7/185* (2006.01)
*H04B 7/00* (2006.01)
*H04W 52/16* (2009.01)

(52) U.S. Cl. ......... 370/318; 370/338; 370/252; 455/522
(58) Field of Classification Search .................. 370/318, 370/328, 329, 338, 334–335, 252; 455/522, 455/67.11, 69
See application file for complete search history.

(56) References Cited

U.S. PATENT DOCUMENTS

| | | | | |
|---|---|---|---|---|
| 7,162,262 B2 * | 1/2007 | Jonsson et al. | ................ | 455/522 |
| 7,630,321 B2 * | 12/2009 | Jain et al. | ................ | 370/252 |
| 7,647,066 B2 * | 1/2010 | Takahashi et al. | ................ | 455/522 |
| 7,660,367 B2 * | 2/2010 | Nishio et al. | ................ | 375/329 |
| 7,782,810 B2 * | 8/2010 | Han et al. | ................ | 370/318 |
| 2001/0019961 A1 * | 9/2001 | Nakahara et al. | ................ | 455/522 |
| 2005/0143113 A1 * | 6/2005 | Lee et al. | ................ | 455/522 |
| 2005/0232135 A1 * | 10/2005 | Mukai et al. | ................ | 370/208 |
| 2005/0272456 A1 * | 12/2005 | Yoshii et al. | ................ | 455/522 |
| 2006/0099984 A1 * | 5/2006 | Brusch et al. | ................ | 455/522 |
| 2009/0069043 A1 * | 3/2009 | Roh et al. | ................ | 455/522 |
| 2009/0316821 A1 * | 12/2009 | Jung et al. | ................ | 375/267 |

FOREIGN PATENT DOCUMENTS

| | | |
|---|---|---|
| KR | 10-0459573 | 12/2004 |
| KR | 10-0750133 | 8/2007 |
| WO | 2008-055179 | 5/2008 |

OTHER PUBLICATIONS

P.Y. Chen et al., "An Index Coding Algorithm for Image Vector Quantization," IEEE Transactions on Computer Electronics, vol. 49, Issue. 4, pp. 1513-1520, Nov. 2003.

* cited by examiner

*Primary Examiner* — Kwang B Yao
*Assistant Examiner* — Candal Elpenord
(74) *Attorney, Agent, or Firm* — Lee, Hong, Degerman, Kang & Waimey

(57) ABSTRACT

A method for transmitting and identifying a transmit power value in a multi-user MIMO scheme is disclosed. The transmit power value transmission method includes calculating available transmit power ratios for respective layers, reducing a number of bits used to represent entire transmit power ratio values by allocating same bit value to a plurality of same transmit power ratio values among the calculated transmit power ratio values for the respective layers; quantizing a transmit power ratio values of symbols to be transmitted to the UE using the entire transmit power ratio values of the reduced number of bits; and transmitting the quantized transmit power ratio values to the UE.

8 Claims, 5 Drawing Sheets

Prior Art

METHOD FOR TRANSMITTING AND IDENTIFYING TRANSMIT POWER VALUE IN MULTI-USER MIMO

CROSS-REFERENCE TO RELATED APPLICATIONS

This application claims the benefit of Korean Patent Application No. 10-2008-0091709, filed on Sep. 18, 2008, which is hereby incorporated by reference as if fully set forth herein.

BACKGROUND OF THE INVENTION

1. Field of the Invention

The present invention relates to a method for efficiently setting transmit power for each user in a system supporting spatial multiplexing using multiple Transmission (Tx) and Reception (Rx) antennas for data transmission between a Base Station (BS) and multiple users.

2. Discussion of the Related Art

Beyond the conventional use of a single Tx antenna and a single Rx antenna, Multi-Input Multi-Output (MIMO) is a technology for increasing the transmission and reception efficiency of data by use of a plurality of Tx antennas and a plurality of Rx antennas. That is, MIMO is a technology for increasing capacity and improving performance by use of multiple antennas at both a transmitter and a receiver in a wireless communication system. 'MIMO' may be used interchangeably with 'multi-antenna'.

The MIMO technology does not depend on a single antenna path to receive a whole message. Rather, it completes the data by combining data fragments received through a plurality of antennas. With the multi-antenna technology, data rate may be increased within a system coverage size, or system coverage may be extended with a specific data rate ensured. Furthermore, MIMO is a future-generation mobile communication technology that may find its use in a wide range including mobile terminals, relays, etc. MIMO may overcome mobile transmission capacity problems encountered with the increased data communications. Considering the future-generation mobile communication requires a much higher data rate than legacy mobile communication, it is expected that an efficient MIMO scheme is needed.

Among a variety of technologies for increasing transmission efficiency under study, MIMO using a plurality of antennas at both a transmitter and a receiver is currently attracting much interest as promising to remarkably increase communication capacity and transmission/reception performance without additional frequency allocation or power increase.

As illustrated in FIG. 1, compared to the use of a plurality of antennas at only one of a transmit end and a receive end, the use of an increased number of antennas at both the transmitter and the receiver increases a theoretical transmission capacity in proportion to the number of antennas, thereby increasing frequency efficiency significantly. Since the theoretical capacity increase of the MIMO system was proved in the middle 1990's, many techniques have been actively studied to increase data rate in real implementation. Some of the techniques have already been reflected in various wireless communication standards for $3^{rd}$ Generation (3G) mobile communications, future-generation Wireless Local Area Network (WLAN), etc.

Active studies are underway in many respects regarding the MIMO technology, inclusive of studies of information theory related to calculation of MIMO communication capacity in diverse channel environments and multiple access environments, studies of measuring radio channels and deriving a model for a MIMO system, studies of time-space signal processing techniques to increase transmission reliability and transmission rate, etc.

There are two types of MIMO schemes: spatial diversity and spatial multiplexing. Spatial diversity increases transmission reliability using symbols that have passed in multiple channel paths, whereas spatial multiplexing increases transmission rate by transmitting a plurality of data symbols simultaneously through a plurality of Tx antennas. Taking the advantages of these two schemes is a recent active study area.

FIG. 1 illustrates the configuration of a typical MIMO communication system.

As illustrated in FIG. 1, it is assumed that there are $N_T$ Tx antennas and $N_R$ Rx antennas in the typical MIMO communication system. For the convenience's sake of description, the MIMO system will be modeled as a mathematical model described below.

Regarding a transmission signal, if $N_T$ Tx antennas are used, up to $N_T$ symbols may be transmitted at one symbol timing. If the number of actual transmission information symbols be denoted by $N_L$, the $N_L$ transmission information symbols are collectively expressed as the following vector. Herein, it is defined that the $N_L$ transmission information symbols are transmitted through different virtual layers.

$$s=[s_1, s_2, \ldots, s_{N_L}]^T \qquad \text{[Equation 1]}$$

where each of the transmission information symbols $s_1, s_2, \ldots, s_{N_L}$ may be transmitted at a different transmit power level. If the root values of the transmit power levels of the transmission information symbols are denoted by $P_1', P_2', \ldots, P_{N_L}'$, respectively, the transmit power-controlled transmission information symbols ŝ may be given vector as [Equation 2].

$$\hat{s}=[\hat{s}_1, \hat{s}_2, \ldots, \hat{s}_{N_L}]^T = [P_1's_1, P_2's_2, \ldots, P_{N_L}'s_{N_L}]^T \qquad \text{[Equation 2]}$$

Also, ŝ may be expressed as a diagonal matrix P of the transmit power levels.

$$\hat{s} = \begin{bmatrix} P_1' & & & 0 \\ & P_2' & & \\ & & \ddots & \\ 0 & & & P_{N_L}' \end{bmatrix} \begin{bmatrix} s_1 \\ s_2 \\ \vdots \\ s_{N_L} \end{bmatrix} = Ps \qquad \text{[Equation 3]}$$

Meanwhile, $N_T$ transmission signals $x_1, x_2, \ldots, x_{N_T}$ transmitted through actual each antennas may be configured by applying a weight matrix W to the transmit power-controlled information vector ŝ. The signal vector x is represented as follows. Herein, $w_{ij}$ denotes a weight between an $i^{th}$ Tx antenna and a $j^{th}$ layer and the weight are expressed as the matrix W. W is referred to as a weight matrix or a precoding matrix.

$$x = \begin{bmatrix} x_1 \\ x_2 \\ \vdots \\ x_i \\ \vdots \\ x_{N_T} \end{bmatrix} \qquad \text{[Equation 4]}$$

-continued $$= \begin{bmatrix} w_{11} & w_{12} & \cdots & w_{1N_L} \\ w_{21} & w_{22} & \cdots & w_{2N_L} \\ \vdots & & \ddots & \vdots \\ w_{i1} & w_{i2} & \cdots & w_{iN_L} \\ \vdots & & \ddots & \vdots \\ w_{N_T1} & w_{N_T2} & \cdots & w_{N_TN_L} \end{bmatrix} \begin{bmatrix} \hat{s}_1 \\ \hat{s}_2 \\ \vdots \\ \hat{s}_j \\ \vdots \\ \hat{s}_{N_L} \end{bmatrix}$$

$$= W\hat{s}$$

$$= WPs$$

The above-mentioned transmission signal x may be considered in two cases: spatial diversity and spatial multiplexing. In spatial multiplexing, different signals are multiplexed to different layers prior to transmission. Accordingly, the elements of the information vector s have different values. In contrast, the same signal is transmitted in a plurality of channel paths in spatial diversity. As a result, the elements of the information vector s have the same value. Spatial multiplexing and spatial diversity may be used in combination. For example, the same signal may be transmitted through three layers in spatial diversity, while different signals may be transmitted through the other layers in spatial multiplexing.

For $N_R$ Rx antennas, signals received at the Rx antennas, $y_1, y_2, \ldots, y_{N_R}$ may be represented as the following vector.

$$y = [y_1, y_2, \ldots, y_{N_R}]^T \qquad \text{[Equation 5]}$$

Channels are identified according to the indexes of Tx and Rx antennas and the channel between a $j^{th}$ Tx antenna and an $i^{th}$ Rx antenna is represented as $h_{ij}$. It is to be noted herein that the index of the Rx antenna precedes that of the Tx antenna in $h_{ij}$. The channels may be represented as a vector and a matrix by grouping them. For instance, the channels from the total of $N_T$ Tx antennas and an $i^{th}$ Rx antenna may be given as $$h_i^T = [h_{i1}, h_{i2}, \ldots, h_{iN_T}]^T \qquad \text{[Equation 6]}$$

FIG. 2 illustrates the channels from the $N_T$ Tx antennas to the $i^{th}$ Rx antenna.

Also, the channels from the $N_T$ Tx antennas to the $N_R$ Rx antenna may be expressed as the following matrix.

$$H = \begin{bmatrix} h_1^T \\ h_2^T \\ \vdots \\ h_i^T \\ \vdots \\ h_{N_R}^T \end{bmatrix} \qquad \text{[Equation 7]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix}$$

Actual channels experience the above channel matrix H and then are added with Additive White Gaussian Noise (AWGN). The AWGN $n_1, n_2, \ldots, n_{N_R}$ added to the $N_R$ Rx antennas is expressed as the following vector.

$$n = [n_1, n_2, \ldots, n_{N_R}]^T \qquad \text{[Equation 8]}$$

From the above modeled equations, the received signal is given as $$y = \begin{bmatrix} y_1 \\ y_2 \\ \vdots \\ y_i \\ \vdots \\ y_{N_R} \end{bmatrix} \qquad \text{[Equation 9]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

The numbers of users and the numbers of antennas at the transmitter and the receiver may be combined in many ways. As a kind of spatial multiplexing, when a transmitter transmits signals to a plurality of users, this is called multi-user MIMO. The multi-user MIMO will be considered separately on a downlink (forward link) and on an uplink (reverse link). The multi-user MIMO downlink is a transmission direction from a BS to a plurality of UEs, whereas the multi-user MIMO uplink is a transmission direction from a plurality of UEs to a BS.

In two extreme downlink cases, for example, signals may be transmitted to a single user through $N_L$ layers, and to $N_L$ users, through one layer for each user. An intermediate case may also be contemplated in which one layer is used for a user and three layers for another user, for example. Likewise on the uplink, there may be two extreme cases in which one user transmits signals through a total of $N_L$ layers and $N_L$ users transmit signals, each user through one layer. Also, an intermediate uplink case is available, in which a user uses one layer and another user uses three layers, for example.

Conventionally, when a BS transmits a transmit power ratio value to a UE, a large overhead results.

SUMMARY OF THE INVENTION

Accordingly, the present invention is directed to a method for transmitting an identifying a transmit power value in multi-user MIMO that substantially obviates one or more problems due to limitations and disadvantages of the related art.

An object of the present invention is to provide a method for transmitting a transmit power ratio values in a minimum number of bits by efficiently quantizing a transmit power ratio values.

Another object of the present invention is to provide a method for reducing the overhead of reception power by identifying a transmit power ratio values using an efficiently quantized transmit power ratio values.

Additional advantages, objects, and features of the invention will be set forth in part in the description which follows and in part will become apparent to those having ordinary skill in the art upon examination of the following or may be learned from practice of the invention.

The objectives and other advantages of the invention may be realized and attained by the structure particularly pointed out in the written description and claims hereof as well as the appended drawings. To achieve these objects and other advantages and in accordance with the purpose of the invention, as embodied and broadly described herein, a method for transmitting, at a base station (BS), a transmit power ratio values of a spatially multiplexed signal to a UE in a BS in a multi-user MIMO scheme comprises calculating available transmit power ratios for respective layers, reducing a number of bits used to represent entire transmit power ratio values by allocating same bit value to a plurality of same transmit power ratio values among the calculated transmit power ratio values for the respective layers, quantizing a transmit power ratio values of symbols to be transmitted to the UE using the entire transmit power ratio values of the reduced number of bits, and transmitting the quantized transmit power ratio values to the UE.

The transmit power ratio values may be ratios of power of the symbols to power of a common reference signal to a cell. The reference signal may be a pilot signal.

The quantizing may include selecting corresponding transmit power ratio values for the respective symbols among the entire transmit power ratio values.

The step of the transmitting is transmitting the quantized transmit power ratio values to the UE through scheduling assignment information.

The entire transmit power ratio values may be pre-stored in the UE.

In another aspect of the present invention, a method for identifying, at a user equipment (UE), a transmit power ratio value of a spatially multiplexed signal in a UE in a multi-user MIMO scheme includes receiving a quantized transmit power ratio values from a BS, calculating a transmit power ratio values of received symbols using the quantized transmit power ratio values and entire transmit power ratio values, and estimating reception powers of the received symbol by multiplying the calculated transmit power ratio by power of a reference signal. The number of the entire transmit power ratio values is reduced by allocating same bit value to a plurality of same transmit power ratios among available transmit power ratio values for the respective layers.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
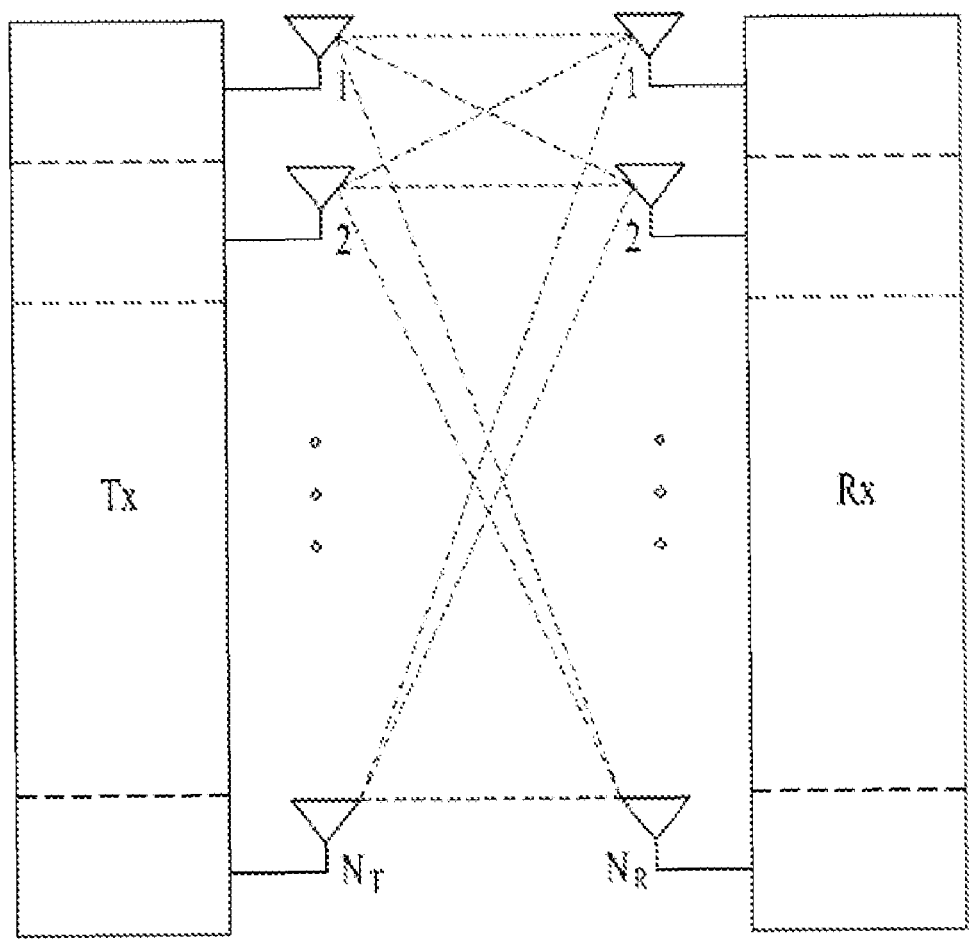
FIG. 1 illustrates the configuration of a typical MIMO communication system.
Figure 2:
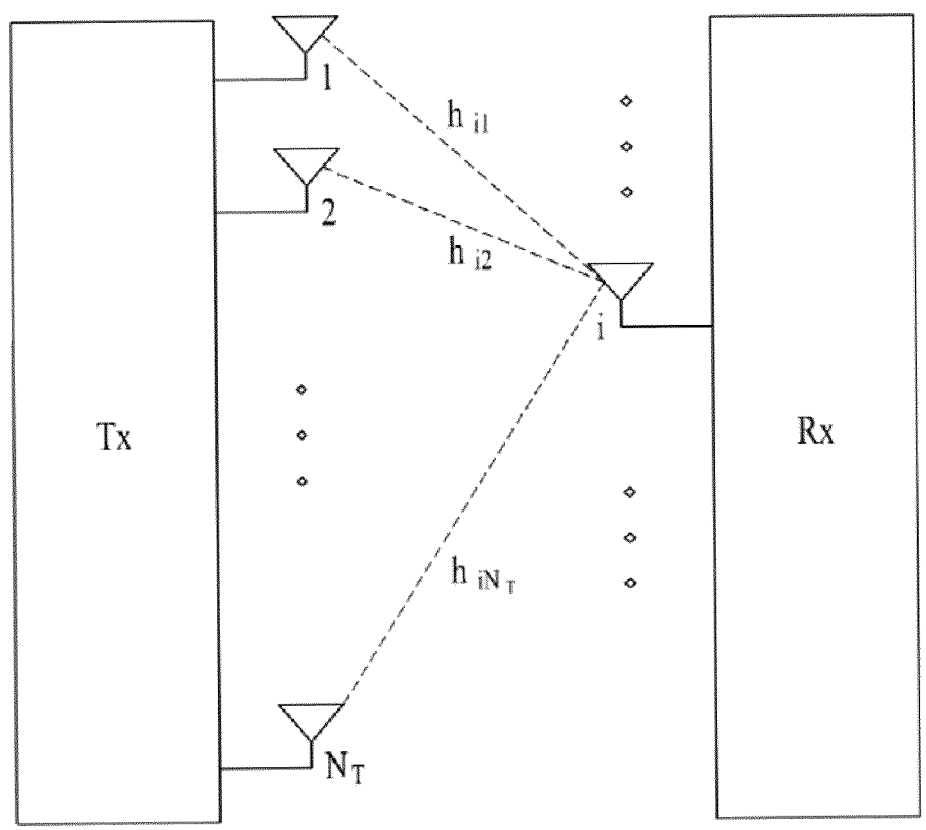
FIG. 2 illustrates channels from a plurality of Tx antennas to one $i^{th}$ Rx antenna in a case illustrated in FIG. 1.

Reference will now be made in detail to the preferred embodiments of the present invention with reference to the accompanying drawings. Those skilled in the art will appreciate that various modifications, additions, and substitutions to exemplary embodiments of the present invention, of which a detailed description will be given below, and the present invention is not limited to the exemplary embodiments.

When a Base Station (BS) transmits spatially multiplexed signals to a plurality of User Equipments (UEs) on a downlink in a multi-user MIMO scheme, each UE need to get knowledge of the reception power of received information symbols for efficiently demodulate received information symbols. To this end, the UE may directly estimate the reception power of the reception signal, for example. Yet, to simplify the reception operation of the UE and prevent errors during reception power estimation, the BS may notify each UE of the transmit power of a signal transmitted to the spatially multiplexed UE through a control channel. Let an $n^{th}$ UE be denoted by $UE_n$. If the BS transmits information symbols $s_1$, $s_2$, $s_3$ and $s_4$ at transmit power levels of $P_1$, $P_2$, $P_3$ and $P_4$, respectively to four UEs in [Equation 3], it may notify the four UEs of $P_1$, $P_2$, $P_3$ and $P_4$. If the BS indicates a ratio of the transmit power of an information symbol to that of a specific reference signal to a UE rather than it directly indicates the absolute value of the transmit power $P_n$, the UE may know the reception power of received information symbols by estimating the reception power of the reference signal. That is, the transmit power ratio values may be a ratio of power of the symbols to power of a common reference signal in a cell. For instance, if specific symbols use pilot signal transmitted at a high transmit power level as the reference signal, the reliability of reception power estimation at UEs may significantly increase.

To be more specific, if the transmit power of the reference signal is $P_{ref}$, a reference transmit power used to indicate the transmit power levels of signals transmitted to spatially multiplexed UEs may be set as $\alpha P_{ref}$. $\alpha$ is an arbitrary constant, which may be predefined, or changed when needed and indicated to each UE each time. When a signal is transmitted with a transmit power of $P_n(=\beta \cdot \alpha P_{ref})$ to $UE_n$, the BS transmits a value $\beta_n$ to $UE_n$ through specific control channel or by upper-layer signaling. Although an actual transmit power ratio delivered to $UE_n$ may be defined as the product of $\beta_n$ and a specific coefficient common to all UEs, $\beta_n$ is referred to as a transmit power ratio value (or transmit power ratio), for notational simplicity.

To deliver a transmit power ratio values to each UE, the transmit power ratio values needs to be quantized. While it is better to densely quantized the transmit power ratio values in terms of the degree of scheduling freedom at the BS or the accuracy of reception power estimation at the UE, denser quantization than needed is not preferably, considering the signaling overhead of the transmit power ratio values. Accordingly, an embodiment of the present invention provides a method for efficiently designing a set of transmit power ratio values allocatable to spatially multiplexed UEs.

More specifically, a number of UEs may be spatially multiplexed through $N_L$ layers is up to $N_L$. If the same transmit power is basically allocated to all spatially multiplexed UEs, a transmit power ratio value of $1/N_L$ should be supported for each UE. Also, transmit power ratio values may be supported in consideration of allocation of different transmit powers for each layers of two UEs, in the case where fewer UEs than $N_L$ are spatially multiplexed. In this case, the degree of scheduling freedom at the BS may be increased. Because the transmit power ratio value $1/N_L$ should be basically supported, $1/N_L$ may be reused in such as manner that the sum of the transmit powers of all layers is kept to be a constant total transmit power using $1/N_L$ as a resolution. For instance, the total transmit power may be readily maintained by allocating transmit power in the manner of $((N_L-1)/N_L, 1/N_L), ((N_L-2)/N_L, 1/N_L, 1/N_L)$, or the like.

As the above-described principle is applied for each numbers of layers supported by system, a choice may be made of transmit power ratio values required for each number of layer $N_L$. For different $N_L$ values, numbers of transmit power ratio values may be differently set. Considering that the same transmit power ratio values may exist for different $N_L$ values, it is efficient in terms of signaling overhead reduction to signal an $N_L$ value and a transmit power ratio value in combination, instead of signaling them independently. Therefore, it is preferred that required transmit power ratio values are selected for each numbers of layers $N_L$ and a plurality of same transmit power ratios for the each numbers of layers $N_L$ may be replaced with one same transmit power ratio, thus acquiring final supported transmit power ratio values to support for the each numbers of layers $N_L$. As a consequence, the number of bits representing the transmit power ratio values is reduced. The entire transmit power ratio values in which a plurality of same transmit power ratio values are replaced with one same transmit power ratio value may be pre-stored in UEs.

If more transmit power ratio values need to be identified by a given number of bits for transmit power ratio value signaling, other transmit power ratio values may be added using extra bit values saved from replacing a plurality of same transmit power ratio values with one same transmit power ratio value.

Figure 3:
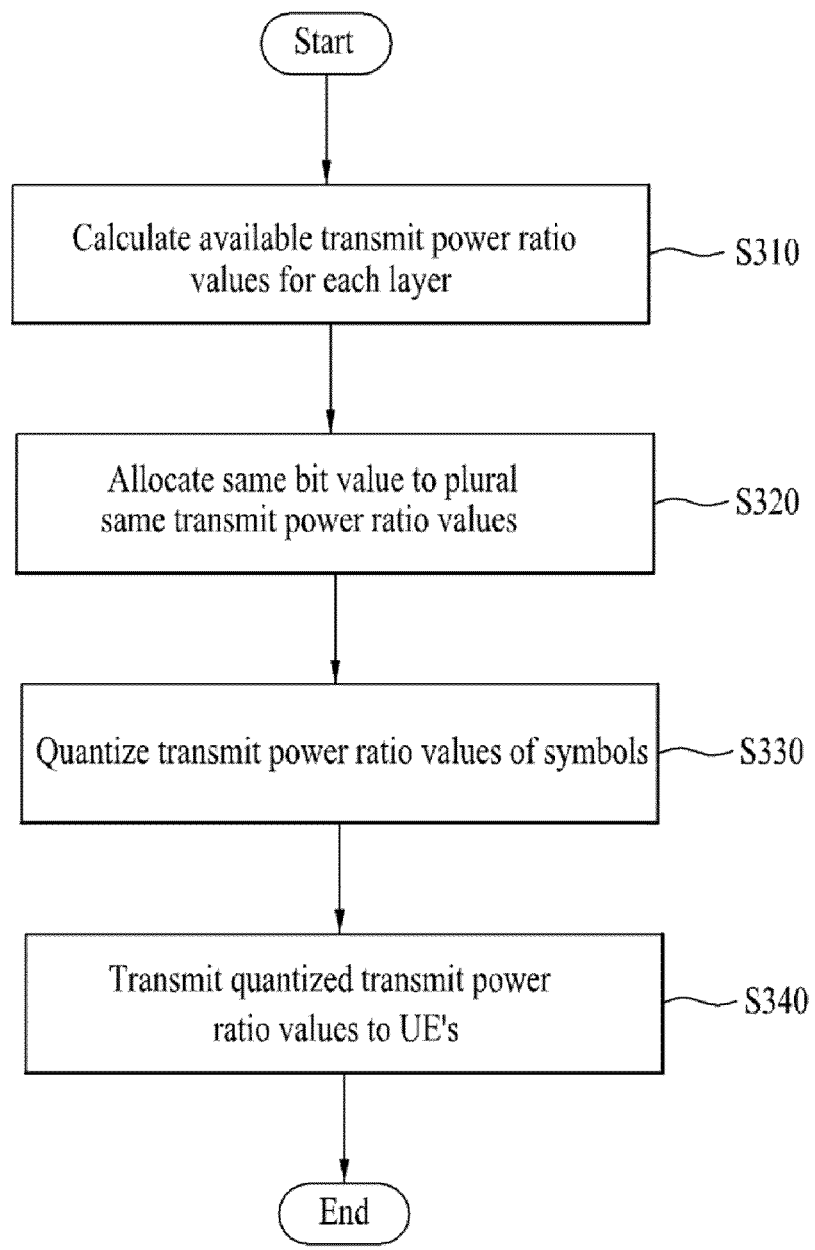
FIG. 3 is a flowchart illustrating a method for transmitting a transmit power ratio values according to an embodiment of the present invention.

FIG. 3 is a flowchart illustrating a method for transmitting a transmit power ratio value according to an embodiment of the present invention.

Referring to FIG. 3, the BS may calculate available transmit power ratio values for respective layers in step S310 and reduces the number of bits to represent the entire transmit power ratio values by allocating one same bit value to a plurality of same transmit power ratio values in step S320. That is, if transmit power ratio values are identical, they are represented by a single bit value despite different ranks.

In step S330, the BS quantizes the transmit power ratios values of symbols to be transmitted to UEs using the entire transmit power ratio values. The quantizing may include encoding the transmit power ratio values and the number of the layers.

Finally, the BS may transmit the quantized transmit power ratio values to the UEs in step S340. Also, the BS may further transmit the number of the layers to UEs.

To be more specific, for example, if the numbers of layers supported by the system are 1, 2 and 4, transmit power ratio values for each number of layers are given as $N_L=1: \beta_n=1$ $N_L=2: \beta_n=1/2, 2/2$ $N_L=4: \beta_n=1/4, 2/4, 3/4, 4/4$ [Equation 10]

The supported transmit power ratio values without duplicate values in Equation 10 are 1/4, 1/2, 3/4 and 1, which may be signaled in two bits.

In another example, if the numbers of layers supported by the system are 1, 2, 3 and 4, transmit power ratios for each number of layers are given as $N_L=1: \beta_n=1$ $N_L=2: \beta_n=1/2, 2/2$ $N_L=3: \beta_n=1/3, 2/3, 3/3$ $N_L=4: \beta_n=1/4, 2/4, 3/4, 4/4$ [Equation 11]

Six transmit power ratio values without duplicate values 1/4, 1/3, 1/2, 2/3, 3/4, and 1 are supported in Equation 11, which may be signaled in three bits. Since eight transmit power ratio values are identifiable with three bits, the remaining two states may be used to further identify two transmit power ratio values or to transmit other information.

The above quantized transmit power ratio values may be transmitted to the UEs by a specific message, for example, scheduling assignment information.

Figure 4:
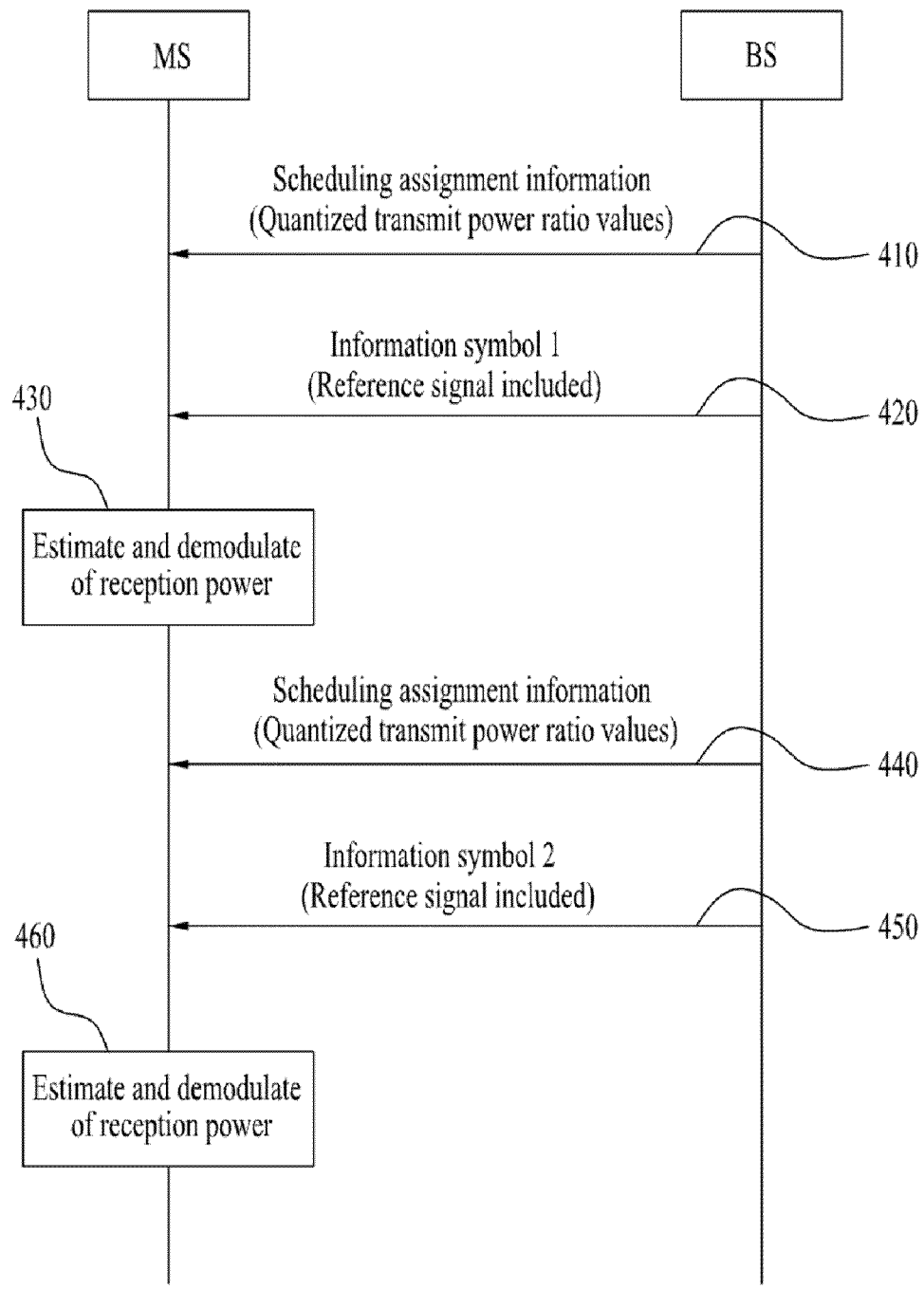
FIG. 4 is a diagram illustrating a signal flow for a procedure for using scheduling assignment information in the embodiment of the present invention illustrated in FIG. 1.

FIG. 4 is a diagram illustrating a signal flow for a procedure for using scheduling assignment information.

Referring to FIG. 4, a UE may receive a quantized transmit power ratio values from the BS through scheduling assignment information in step 410. Also, a UE may further receive a quantized the number of the layers from the BS through scheduling assignment information and then a UE receives an information symbol in step 420. The information symbol may include a reference signal. In step 430, the UE estimates the reception power of the information symbol based on the received transmit power ratio values and demodulates the information symbols in step 430.

In step 440, each time the BS transmits scheduling assignment information, the UE may receive a quantized transmit power ratio values, the UE then receives another information symbol in step 450 and estimates the reception power of the received information symbol based on the received transmit power ratio values and demodulates the information symbol in step 460.

Figure 5:
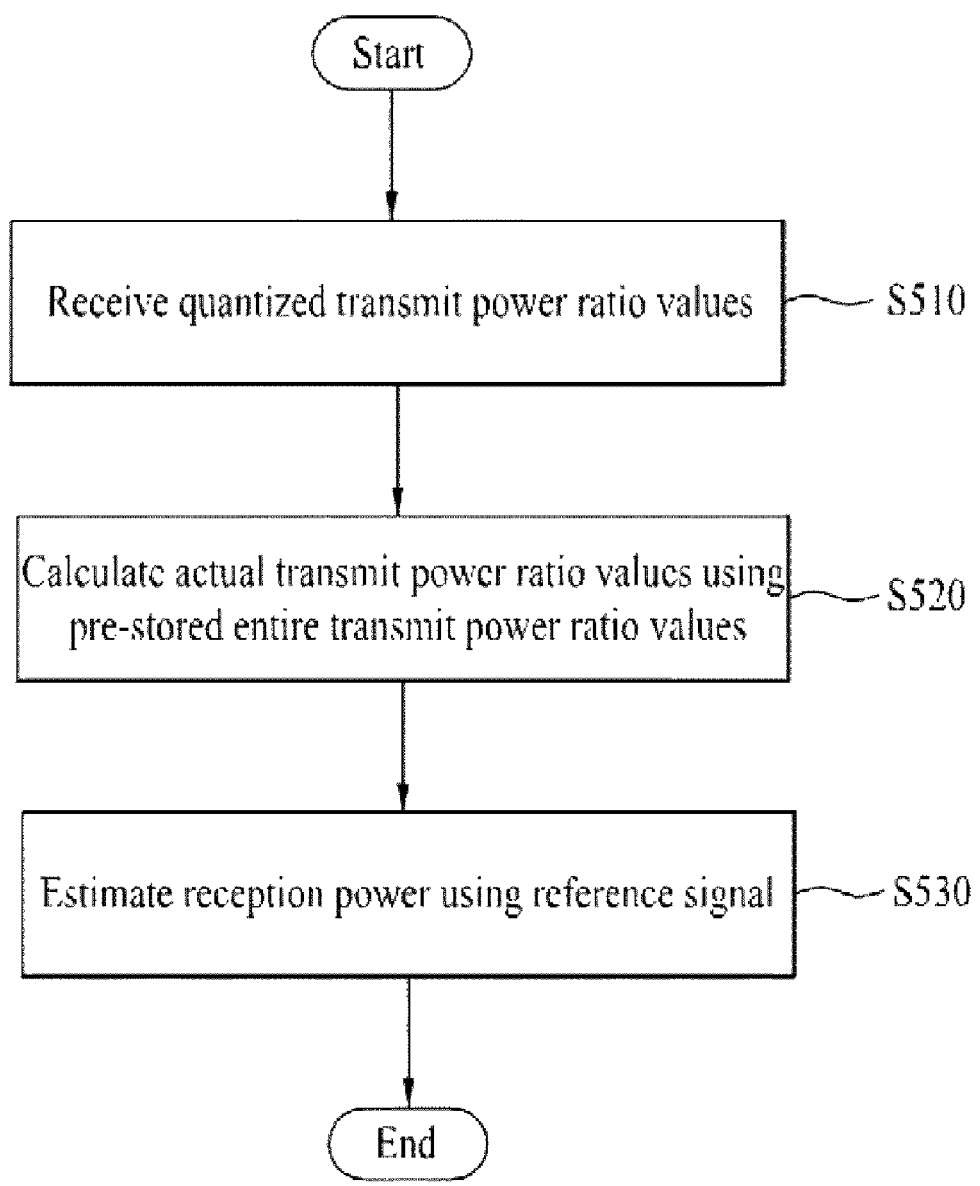
FIG. 5 is a flowchart illustrating a method for identifying a transmit power value according to an embodiment of the present invention.

FIG. 5 is a flowchart illustrating a method for identifying a transmit power ratio value according to an embodiment of the present invention.

Referring to FIG. 5, the UE may receive a quantized transmit power ratio values from the BS in step S510. Also, a UE may further receive a quantized the number of the layers from the BS.

In step S520, the UE calculates the transmit power ratio of a received symbol using the quantized transmit power ratio and entire transmit power ratios. The entire transmit power ratios are information that may be represented in a minimum number of bits by allocating one same bit value to a plurality of same transmit power ratios among transmit power ratios available to respective layers.

In step S530, the UE estimates the reception power of the received symbol by multiplying the power of a reference signal by the calculated transmit power ratio values.

As is apparent from the above description, a transmit power ratio values is set for each UE and signaled with a minimal overhead in a multi-user MIMO scheme using multiple Tx and Rx antennas according to an embodiment of the present invention. Therefore the UE can efficiently estimate reception power.

The present invention, which enables a UE to efficiently estimate reception power by setting a transmit power for the UE and signaling the transmit power with a minimal overhead in a multi-user MIMO scheme using multiple Tx and Rx antennas, is applicable to BSs, UEs, etc. in systems including $3^{rd}$ Generation Partnership Project Long Term Evolution (3GPP LTE), etc.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting, at a base station (BS), a transmit power value of a spatially multiplexed signal to a user equipment (UE) in a multi-user Multiple-Input Multiple-Output (MIMO) scheme, the method comprising: calculating transmit power ratio values for respective layers; reducing a number of bits used to represent entire transmit power ratio values by allocating same bit value to a plurality of same transmit power ratio values among the calculated transmit power ratio values for the respective layers; quantizing transmit power ratio values of symbols to be transmitted to the UE using the entire transmit power ratio values of the reduced number of bits; and transmitting the quantized transmit power ratio values to the UE.

2. The method according to claim 1, wherein the transmit power ratio values are ratios of power of the symbols to power of a common reference signal to a cell.

3. The method according to claim 2, wherein the reference signal is a pilot signal.

4. The method according to claim 1, wherein the quantizing includes selecting corresponding transmit power ratio values for respective symbols among the entire transmit power ratio values.

5. The method according to claim 1, wherein the step of the transmitting is transmitting the quantized transmit power ratio to the UE through scheduling assignment information.

6. The method according to claim 1, wherein the entire transmit power ratio values are pre-stored in the UE.

7. The method according to claim 1, wherein the quantizing includes encoding the transmit power ratio values and a number of the layers.

8. A method for identifying, at a user equipment (UE), a transmit power value of a spatially multiplexed signal in a multi-user Multiple-Input Multiple-Output (MIMO) scheme, the method comprising: receiving quantized transmit power ratio values from a Base Station (BS); calculating transmit power ratio values of received symbols using the quantized transmit power ratio values and entire transmit power ratio values; and estimating reception powers of the received symbols by multiplying the calculated transmit power ratio values by power of a reference signal, wherein the entire transmit power ratio values are calculated for respective layers and a number of bits of the entire transmit power ratio values is reduced by allocating same bit value to a plurality of same transmit power ratio values among the calculated transmit power ratio values for the respective layers.

* * * * *